United States Patent
Denolf et al.

(10) Patent No.: US 12,271,818 B1
(45) Date of Patent: Apr. 8, 2025

(54) IMPLEMENTATION-TUNED ARCHITECTURE FOR NEURAL NETWORK PROCESSING IN A LEARNED TRANSFORM DOMAIN

(71) Applicant: XILINX, INC., San Jose, CA (US)

(72) Inventors: Kristof Denolf, Longmont, CO (US); Alireza Khodamoradi, San Diego, CA (US); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 989 days.

(21) Appl. No.: 17/330,048

(22) Filed: May 25, 2021

(51) Int. Cl.
*G06N 3/08* (2023.01)
*G06N 3/04* (2023.01)
*G06N 3/082* (2023.01)

(52) U.S. Cl.
CPC .............. *G06N 3/082* (2013.01); *G06N 3/04* (2013.01)

(58) Field of Classification Search
CPC ................................. G06N 3/082; G06N 3/04
See application file for complete search history.

(56) References Cited

U.S. PATENT DOCUMENTS

| | | | | |
|---|---|---|---|---|
| 10,853,726 B2 * | 12/2020 | Zoph | ....................... | G06N 3/045 |
| 2020/0104715 A1 | 4/2020 | Denolf et al. | | |

FOREIGN PATENT DOCUMENTS

| | | | | | |
|---|---|---|---|---|---|
| CN | 106796668 B | * | 6/2019 | ............. | G06F 30/39 |
| CN | 112313666 A | * | 2/2021 | ........... | C12Q 1/6874 |
| CN | 112347550 A | * | 2/2021 | ............. | G06F 30/13 |
| CN | 115238883 A | * | 10/2022 | | |
| CN | 111488976 B | * | 6/2023 | ............. | G06F 7/483 |
| CN | 111488963 B | * | 11/2023 | ............. | G06F 7/483 |
| WO | WO-2021022903 A1 | * | 2/2021 | ............. | G06N 3/044 |
| WO | WO-2021036892 A1 | * | 3/2021 | ............. | G06N 3/044 |

OTHER PUBLICATIONS

Fujieda, S. et al. "Wavelet Convolutional Neural Networks." ArXiv abs/1805.08620 (2018), 10 pages.
M. X. Bastidas Rodriguez et al., "Deep Adaptive Wavelet Network," 2020 IEEE Winter Conference on Applications of Computer Vision (WACV), 2020, pp. 3111-3119.
Xu, Kai et al. "Learning in the Frequency Domain." 2020 IEEE/CVF Conference on Computer Vision and Pattern Recognition (CVPR) (2020): 1740-1749.
Hou, Yunzhong et al. "Learning to Structure an Image With Few Colors." 2020 IEEE/CVF Conference on Computer Vision and Pattern Recognition (CVPR) (2020): 10116-10125.

* cited by examiner

*Primary Examiner* — Hassan Mrabi
(74) *Attorney, Agent, or Firm* — Patterson + Sheridan, LLP

(57) ABSTRACT

Embodiments herein describe a learnable transform block disposed before, or in between, the neural network layers to transform received data into a more computational-friendly domain while preserving discriminative features required for the neural network to generate accurate results. In one embodiment, during a training phase, an AI system learns parameters for the transform block that are then used during the inference phase to transform received data into the computational-friendly domain that has a reduced size input. The transformed data may require less compute resources or less memory usage to process by the underlying hardware device that hosts the neural network.

20 Claims, 7 Drawing Sheets

IMPLEMENTATION-TUNED ARCHITECTURE FOR NEURAL NETWORK PROCESSING IN A LEARNED TRANSFORM DOMAIN

TECHNICAL FIELD

Examples of the present disclosure generally relate to learning optimized parameters for a transform block in an artificial intelligence (AI) system.

BACKGROUND

AI systems such as neural networks typically require large amounts of compute resources and memory. Current solutions ignore the cost of executing a neural network in hardware, and instead focus solely on the accuracy of the neural network.

SUMMARY

One embodiment describes a method that includes receiving training data at a transform block, transforming the training data using the transform block to generate transformed data where the transformed data requires at least one of less compute resources or less memory to process by a hardware device hosting a neural network, inputting the transformed data to a layer in the neural network, and learning parameters for the transform block during a training phase of the neural network, wherein adjusting the parameters for the transform block adjusts an amount of compute resources or memory used by the hardware device when processing the transformed data.

Another embodiment described herein is a computing system that includes a processor and a memory storing an application which, when executed by the processor, performs an operation. The operation includes receiving training data at a transform block, transforming the training data using the transform block to generate transformed data where the transformed data requires at least one of less compute resources or less memory to process by a hardware device hosting a neural network, inputting the transformed data to a layer in the neural network, and learning parameters for the transform block during a training phase of the neural network, wherein adjusting the parameters for the transform block adjusts an amount of compute resources or memory used by the hardware device when processing the transformed data.

Another embodiment described herein is a non-transitory computer readable medium having program instructions embodied therewith, the program instructions executable by a processor to perform an operation. The operation includes receiving training data at a transform block, transforming the training data using the transform block to generate transformed data where the transformed data requires at least one of less compute resources or less memory to process by a hardware device hosting a neural network, inputting the transformed data to a layer in the neural network, and learning parameters for the transform block during a training phase of the neural network, wherein adjusting the parameters for the transform block adjusts an amount of compute resources or memory used by the hardware device when processing the transformed data.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
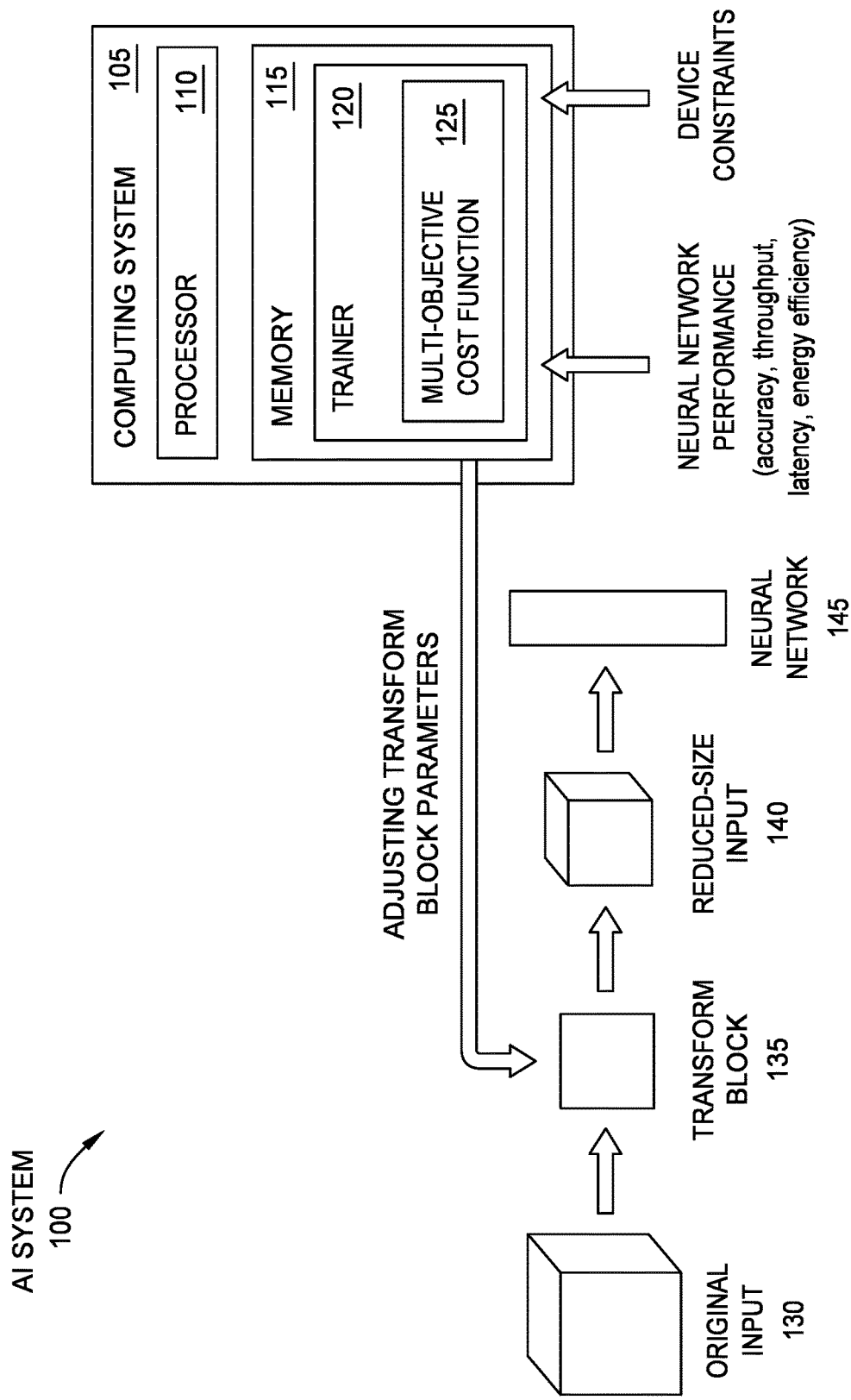
FIG. 1 illustrates an AI system that learns parameters for a transform block during a training phase, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein mitigate the high compute/memory demands in neural networks and their actual implementation into a hardware backend by adding a learnable transform block before, or in between, the neural network layers to transform received data into a more computational-friendly domain while preserving discriminative features required for the neural network to generate accurate results. In one embodiment, during a training phase, an AI system learns parameters for the transform block that are then used during the inference phase to transform received data into the computational-friendly domain that has a reduced size input. The transformed data may require less compute resources or less memory usage to process by the underlying hardware device (e.g., a central processing unit (CPU) or specialized hardware accelerator such as a field programmable gate array (FPGA), graphics processing unit (GPU), or system on a chip (SoC)).

In one embodiment, the AI system uses a multi-objective cost function that maximizes accuracy while minimizing the inference implementation cost for the target hardware device. That is, while current AI system typically consider only the accuracy of the neural network during training, the embodiments herein adjust the parameters of the transform block to pack discriminative features/information of the training data into a more dense/compact representation while preserving the accuracy of the prediction made by the neural network. During inference, this dense/compact representation allows reducing the hardware implementation cost of the neural network while having a small or no impact on the accuracy of the prediction made by the neural network.

FIG. 1 illustrates an AI system 100 that learns parameters for a transform block 135 during a training phase, according to an example. The AI system 100 includes a computing system 105 for training the AI system 100. As shown, the computing system 105 includes a processor 110 which represents any number of processing cores on any number of processing elements (e.g., CPUs) and a memory 115 that can include volatile memory elements, non-volatile memory elements, and combinations thereof.

The memory 115 includes a trainer 120 (e.g., a software application executed by the processor 110) that identifies parameters for the transform block 135 as well as weights for layers in a neural network 145. In this example, the trainer 120 uses a multi-objective cost function 125 to adjust the parameters of the transform block 135 to identify the discriminative features/information of the training data which can be packed into a more dense/compact representation. That is, the multi-objective cost function 125 balances or optimizes the tradeoff between removing features from the original input 130 using the transform block 135 (which reduces the cost of implementing the neural network 145 in the target hardware device) and the accuracy of the neural network 145.

As shown, the trainer 120 receives neural network performance data such as accuracy, throughput, latency, energy efficiency, etc. which is balanced with the constraints of the target device (e.g., a host computing system, hardware accelerator, etc.). The device constraints can include the number of cores, data processing engines, data processing paths, on-chip memory, off-chip memory, etc. in the hardware device. During training, the trainer 120 adjusts the block parameters, which changes the manner in which the transform block 135 transforms the original input 130 from a first domain into a second domain. This transformed data (i.e., a reduced-size input 140) is then input into one of the layers in the neural network 145. The trainer 120 can then learn how this transform affected the neural network performance data (e.g., whether it improved/decreased accuracy, throughput, latency, or energy efficiency) by evaluating the prediction or output generated by the neural network 145. The trainer 120 can then use the multi-objective cost function 125 to identify an optimized solution that, for example, maximizes accuracy of the neural network 145 while minimizing the inference implementation cost for the target hardware device.

In general, the transform block 135 performs a transform operation that reduces the computational or memory resources required for processing the original input 130. For example, the transform block 135 may reduce tensor sizes (e.g., reduce spatial dimensions of the tensors) in the original input 130, decrease the input (tensor) bit-width (e.g., reducing for 32-bit integer values to 16-bit integer values, or from floating point values to integer values), reduce sharpness or feature detail in image data in the original input 130, perform data compression, and the like. In one embodiment, the transform block 135 may use learned parameters for classical transforms such as Discrete Cosine Transform (DCT) or Discrete Wavelet Transform (DWT). Nonetheless, the embodiments herein can be used with any transform where parameters can be learned in order to reduce the computational or memory resources corresponding to the original input 130 by transforming it into the reduced-size input 140.

Moreover, while FIG. 1 illustrates placing the transform block 135 at the input of the neural network 145, in other embodiments the transform block 135 may be disposed between two layers in the neural network 145. In that example, the original input 130 may be received and processed by one or more layers in the neural network 145 before reaching the transform block 135 where the data is transformed into the reduced-size input 140 and then forwarded to an additional layer or layers in the neural network. Further, the AI system 100 can include different transform blocks 135 that can perform the same or different transform functions. Identifying multiple transform blocks 135 to inject into an AI system is discussed in FIG. 3.

Figure 2:
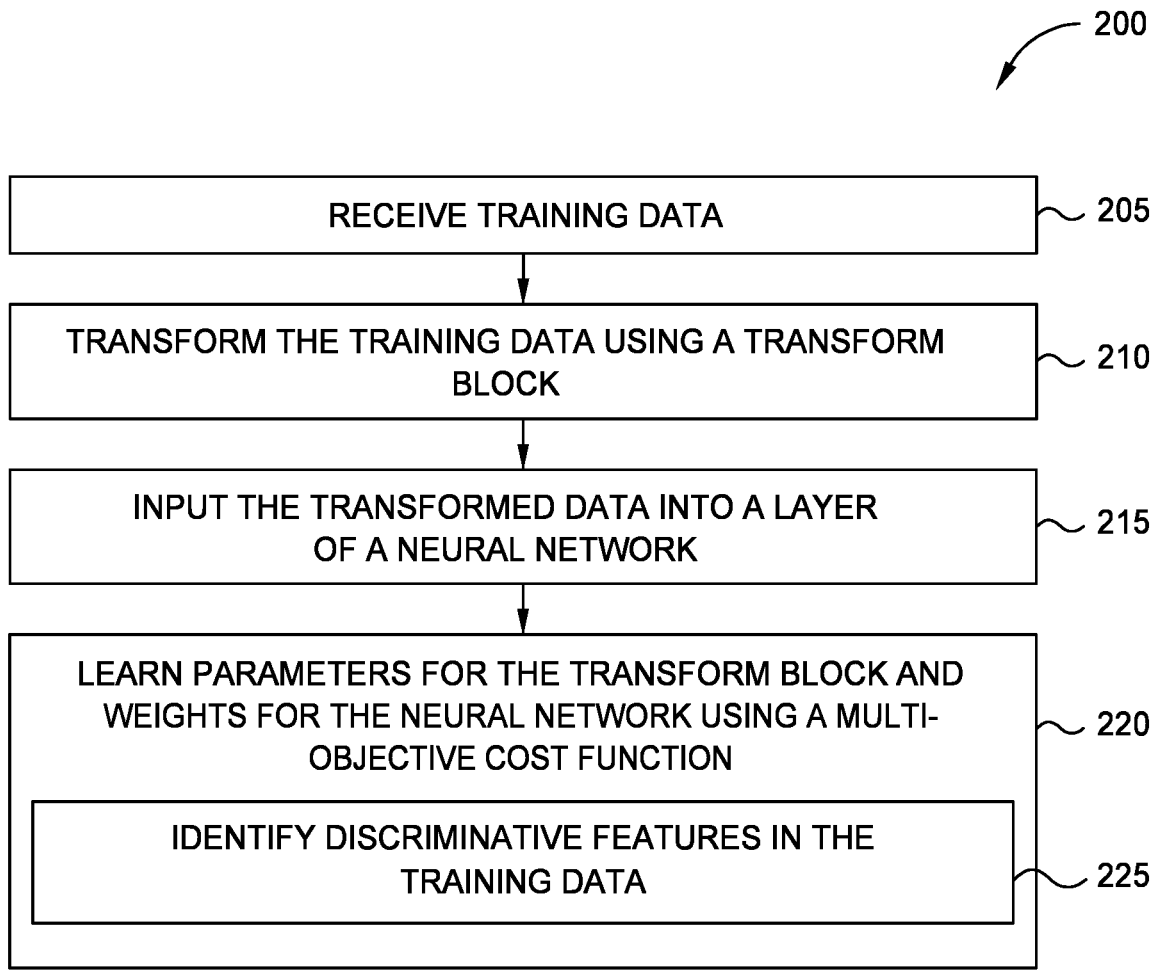
FIG. 2 is a flowchart for learning parameters for a transform block during a training phase, according to an example.

FIG. 2 is a flowchart of a method 200 for learning parameters for a transform block during a training phase, according to an example. At block 205, the AI system receives training data. In one embodiment, the training data is annotated training data that indicates the "correct answer" that the neural network should output when processing the training data. For example, if the AI system is used for image processing, the training data may indicate what type of object is displayed in each image. That way, the trainer can determine whether the neural network correctly identified the object in the images, and can adjust the weights of the layers in the neural network accordingly.

At block 210, the transform block transforms the training data using a transform block. In one embodiment, the transform block is disposed at the input of the neural network. That is, the transform block transforms the received data into a reduced-size input before the data is process by any layer in the neural network. Alternatively, in another embodiment, the transform block is disposed between two layers in the neural network. In that example, the earlier layers in the neural network may process the original training data while the layers subsequent to the transform block process a reduced-size input.

As mentioned above, the transform block can be any transform that reduces the computational or memory resources used when processing the received training data. For example, the transform block may remove a column in a tensor, or reduce the depth of the tensor. In another example, the transform block may reduce the bit-size of the data values in the tensor (e.g., 32-bits to 16-bits). In another embodiment, the transform block performs a data compression algorithm on the training data. In yet another example, the transform block reduces the quality of the training data (e.g., using a lower encoding rate for audio training data, or reducing the sharpness of training data). In another embodiment, the transform block may remove portions of the training data that is above or below a set threshold. For example, the transform block may remove portions of an image, or remove data that is above (or below) a certain frequency. Further, the transform block can perform any of these transforms individually or in combination.

In any case, the transform block has adjustable parameters. That is, the transform performed by the transform block can be adjusted by the trainer during the training phase. As explained below, the trainer can adjust the parameters of the transform block during training which changes the transform performed by the block. For example, the trainer may adjust the parameter so instead of reducing the data values in the training data from 32-bit to 16-bit, it reduces the data values from 32-bit to 8-bit. Of course, the trainer may adjust the parameters in the other direction where the transform block does less data compression on the received training data.

At block 215, the transform block inputs the transformed data into a layer of the neural network where the data is processed to eventually output a prediction or answer. This prediction or answer can be compared to a known answer for the training data to determine whether the neural network was able to accurately interpret the training data.

At block 220, the trainer learns the parameter (or parameters) for the transform block and weights for the neural network using a multi-objective cost function. That is, when adjusting the parameters for the transform block and the weights for the neural network, the trainer considers the interdependency between these system parameters. For example, aggressively reducing the size of the training data may have a negative impact on performance of the neural network (e.g., accuracy, throughput, latency, or energy efficiency). On the other hand, performing a less aggressive transform on the training data may mean greater hardware cost, which can decrease execution time and consume additional power during inference.

At block 225, the trainer attempts to identify discriminative features of the training data which can be packed into a more dense/compact representation. As used herein "discriminative features" in the training data have a substantial impact, according to a threshold, on the accuracy of the neural network if these features are removed by the transform block. This is in contrast to "unimportant features" which are data in the training data that has little to no impact on the accuracy of the prediction generated by the neural network In one embodiment, the trainer iterates through a search space to adjust the parameters of the transform block, which in turn, adjusts the characteristics of the reduced-size input which is provided to the neural network. By monitoring the impact adjusting the parameters has on the accuracy of the neural network (or any other measurable neural network performance value), the trainer can distinguish between the unimportant and the discriminative features in the training data. For example, if the trainer adjusts the transform block to reduce the depth of the tensors to a value of X but the accuracy of the neural network remains the same (or only falls by a very small percentage (e.g., less than 1%), then the trainer can determine that having a depth value greater than X is an unimportant feature. During another trainer iteration, the trainer may adjust the transform block to further reduce the depth of the tensor to a value of Y (where Y is less than X). In that case, the trainer may determine the accuracy of the neural network fell a larger portion—e.g., greater than 2%. In that case, the trainer may determine that having a depth greater than Y (but less than X) is a discriminative feature since it has a significant impact on the accuracy of the neural network.

This same process can be done for other parameters that control, e.g., bit-width, height and width of the tensors (spatial dimensions), sharpness of images, frequency content of the data, different compression algorithms, different transforms (DCT or DWT), and the like. As the trainer navigates its search space and adjusts one or more of these parameters, the trainer can identify which adjustment corresponds to discriminative features. For example, for image detection, the portion of the audio data with frequency content above a threshold frequency may be unimportant features to the neural network when performing a speech-to-text conversion. Thus, the transform block can remove this unimportant feature (as well as any number of other unimportant features) from the training data without having a significant negative impact on the performance of the neural network. The trainer can use any number of predefined or adjustable thresholds to determine whether an adjustment to a parameter of the transform block resulted in removing an unimportant or discriminative feature from the training data.

In one embodiment, the trainer identifies parameters for the transform block that remove the most unimportant features from the training data while maximizing the performance of the neural network. For example, the multi-objective cost function may balance between reducing the cost of the hardware implementation while maximizing the performance of the neural network. However, if adjusting a parameter of the transform block results in reducing memory usage by 20% (which may mean the target device can rely solely on on-chip memory) but causes a 2% drop in accuracy, the trainer may keep this parameter adjustment since the reduction in hardware cost greatly outweighs the reduction in accuracy. However, if adjusting a parameter of the transform block results in reducing memory usage by 3% but causes a 1% drop in accuracy, the trainer may revert the parameter to its previous value since the reduction in hardware cost is not worth the reduction in accuracy. In this manner, the trainer can balance the hardware costs of the target device with the performance of the neural network.

In one embodiment, the trainer first trains the neural network by determining the weights that result in the optimal performance of the neural network. These weights may then be used while the trainer adjusts the parameters of the transform block. That is, the parameters of the transform block can be learned separate from learning the weights for the neural network. However, in another embodiment, the trainer may adjust the weights of the neural network in parallel with adjusting the parameters of the transform block. In other embodiments, student-teacher approaches, re-training, transfer training, etc. can be used to train the neural network to balance between the performance of the neural network and the hardware implementation costs as discussed above.

Figure 3:
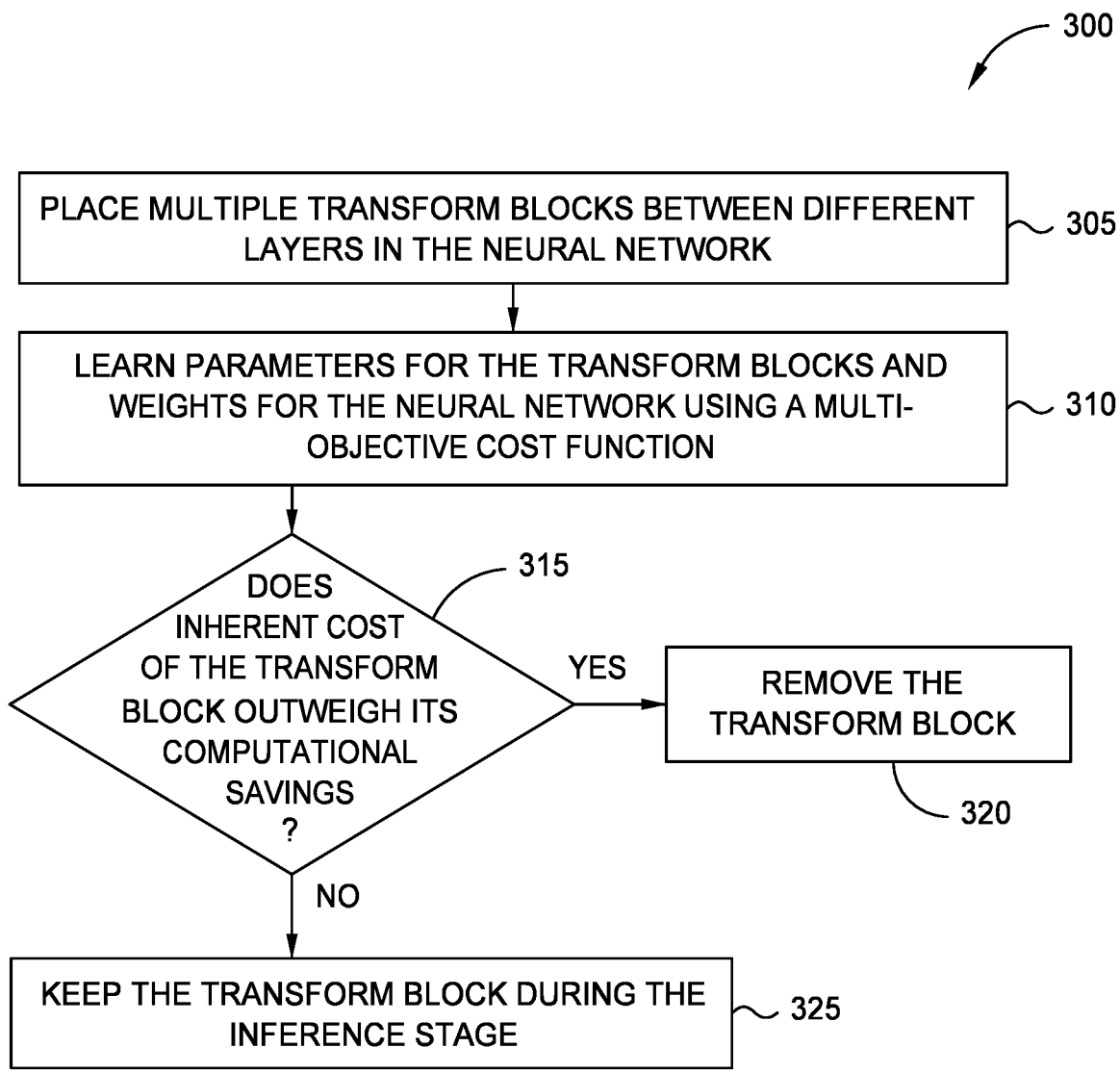
FIG. 3 is a flowchart for identifying the number of transform blocks to use in a neural network during a training phase, according to an example.

FIG. 3 is a flowchart of a method 300 for identifying the number of transform blocks to use in a neural network during a training phase, according to an example. At block 305, the trainer places multiple transform blocks between different layers in the neural network before starting the training phase.

Figure 4A:
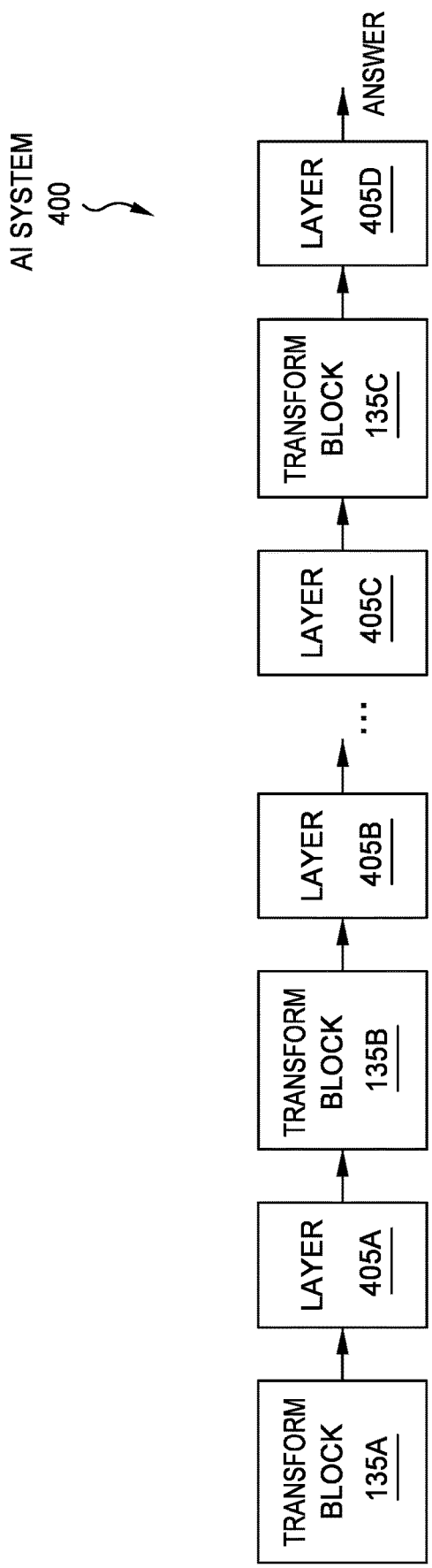
FIGS. 4A and 4B illustrate a neural network during the training phase and the inference phase, according to an example.

FIG. 4A illustrates an AI system 400 during the training phase, according to an example. In this example, the trainer has placed multiple transform blocks 135 into the AI system 400. Specifically, a transform block 135A is disposed in front of the first layer 405A of the neural network while the transform blocks 135B and 135C are disposed between the layers 405A and 405B and the layers 405C and 405D, respectively. In one embodiment, the trainer disposes a transform block between each pair of layers 405. Alternatively, the trainer disposes a transform block between certain pairs of layers 405, but not between every layer 405. Further, the trainer does not have to include a transform block 135A in front of the first layer 405.

The layers 405 are not limited to any particular layer and can include convolution layers, pooling layers, fully connected layers, rectified linear (ReLU) layers, etc.

Returning to the method 300 in FIG. 3, at block 310 the trainer learns parameters for the transform blocks and the weights for the neural networks using the multi-objective cost function. That is, the trainer can perform any of the techniques described above in method 200 to identify optimal parameters for the transform blocks and the weights of the layers in the neural network.

In one embodiment, during method 300, the trainer adjusts parameters for multiple transform blocks in parallel. Moreover, the transform function performed by each of the transform blocks may be different. Referring to FIG. 4A, the trainer may determine it is optimal for the transform block 135A to perform data compression on received training data while the transform block 135B reduces the bit-width of received training data and removes any data with frequency content above a threshold. The features that are unimportant to the transform block 135A may be discriminative to the transform block 135B, and thus, the trainer may perform different transforms using the transform blocks 135A and 135B. However, the trainer may learn that the same transform may be performed by multiple blocks 135. For example, the transform block 135A may convert 64-bit values in the training data to 32-bit width values, the transform block 135B may convert the received 32-bit values in the training data to 16-bit width values, and the transform block 135C may convert the received 16-bit values in the training data to 8-bit width values.

At block 315, the trainer determines whether an inherent computational cost of executing the transform block outweighs its computational savings. That is, in the previous block 310, the trainer may have already determined that the transform block reduces the computational cost of the target device while maximizing the performance of the neural network. However, this does not consider whether the inherent cost of executing the transform block on the target devices outweighs the reduction in the computation cost of the target device resulting from transforming the data. If the inherent cost of the transform block outweighs the advantage of performing the data transform, this means keeping the transform block in the AI system would, on the whole, costs more computational resources in the target device than it would save. In that case, the method 300 proceeds to block 320 where the trainer removes the transform block from the AI system.

However, assuming the inherent computation cost of executing the transform block does not outweigh the advantage of performing the data transform, the method 300 proceeds to block 325 where the trainer determines to keep the transform block in the AI system. The trainer can perform this analysis for each of the transforms blocks in the AI system. The transform blocks that remain in the AI system after the method 300 is completed are then used during the inference phase to process application data.

Figure 4B:
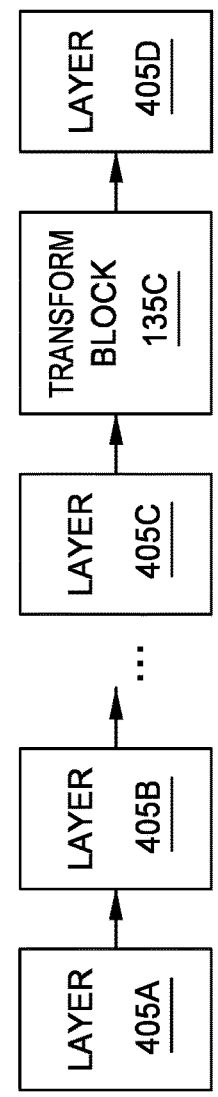

FIG. 4B illustrates the AI system 400 during the inference phase, according to an example. In this example, the method 300 can be used to determine that the inherent computation costs of the transform blocks 135A and 135B exceed the reduction in the hardware cost of the target device from performing the data transform. As such, the trainer has removed these transform blocks from the AI system 400 in FIG. 4B. In contrast, the trainer has determined that the reduction in the hardware cost of the target device from performing the data using the transform block 135C outweighs the inherent computation costs of the transform block 135C. As such, the trainer determined to keep the transform block 135C in the AI system 400. Thus, during the inference phase, the AI system 400 uses the transform block 135C to transform the data outputted by the layer 405C before the transformed data is inputted into the layer 405D.

Although not shown in FIGS. 4A and 4B, in one embodiment a transform block is added after the last layer of the neural network. In addition to receiving the output of the neural network, this transform block also receives the original input to the neural network. In that case, the output of the neural network serves as parameters for this transform block to produce a more efficient (e.g., compressed) representation for a downstream task, or to communicate the data to another hardware entity.

Figure 5:
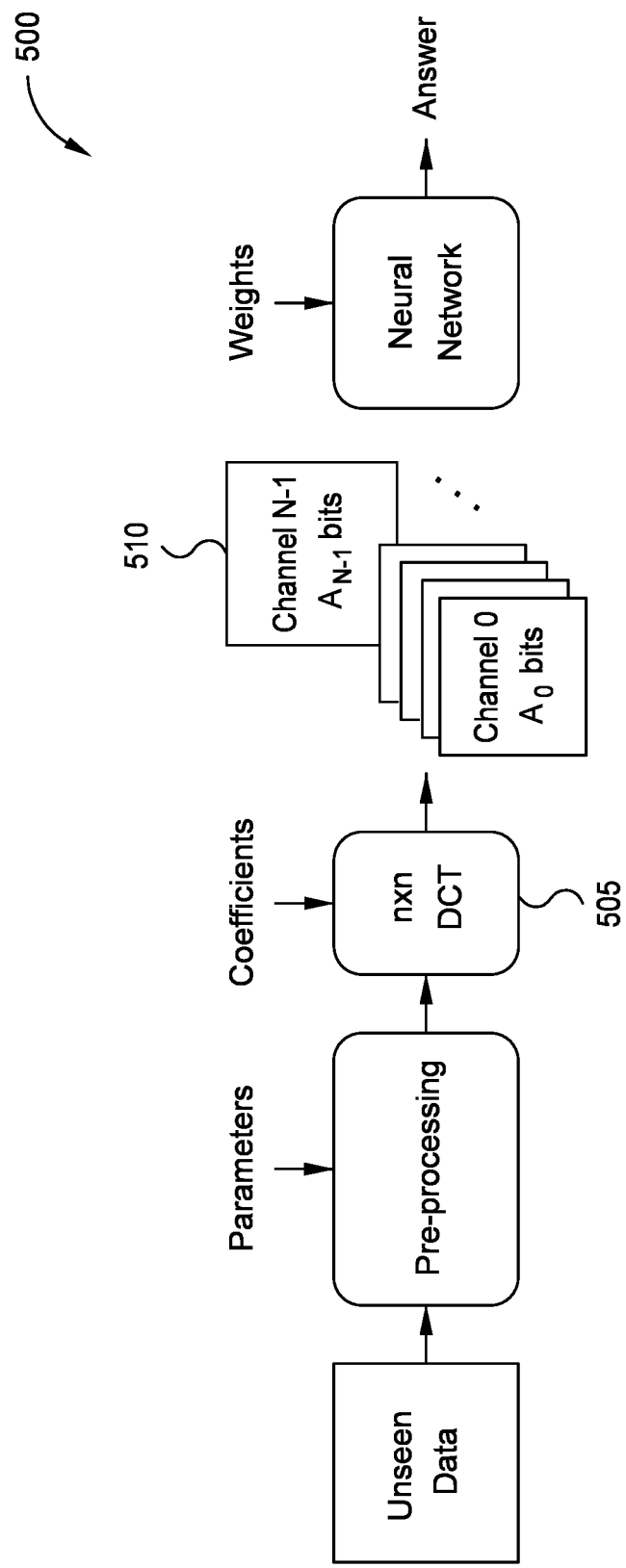
FIG. 5 illustrates identifying parameters for a transform block that is related to the Discrete Cosine Transform, according to an example.

FIG. 5 illustrates identifying parameters for a transform block that is related to the DCT, according to an example. DCT is a widely used transform coding compression algorithm in digital media. DCT is an important block in image and video compression to expose spatial correlation and represent a nxn block in the frequency domain. For example, an 8x8 DCT can be used to perform image classification in the frequency domain, leading to a higher accuracy and better resiliency. In FIG. 5, however, the coefficients for the nxn DCT block 505 are trainable rather than being fixed as is typical with DCT blocks. The trainer can learn the appropriate bit width $A_i$ of each frequency channel 510 after the DCT block 505. Learning the optimal transform for the DCT block 505 allows investing higher bit-widths to more important frequency channels 510 for the neural network task, leading to a more optimal accuracy versus implementation cost inference design 500. Whenever the training assigns 0 bits to a certain frequency channel 510, it can be pruned away. If an FPGA is the target device for executing the design 500, the programmable logic in the FPGA can support any bit-width. If a SoC containing hardened data processing engines is the target device, the bit-width of the frequency channels 510 may match the supported datatypes of the data processing engines.

After the coefficients of the DCT block 505 are learned, however, the transform may have changed into a transform function different from a DCT, although in other implementations, the DCT block 505 may remain a DCT after being trained.

Figure 6:
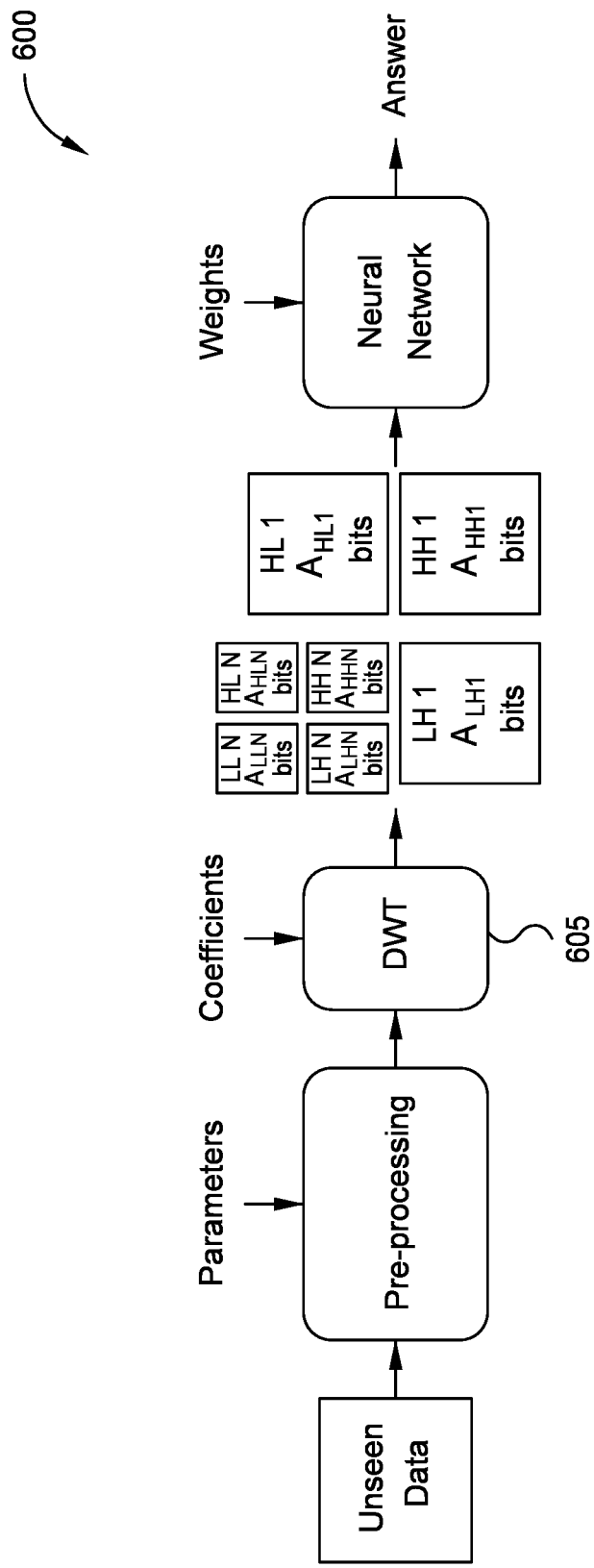
FIG. 6 illustrates identifying parameters for a transform block that is related to the Discrete Wavelet Transform, according to an example.

FIG. 6 illustrates identifying parameters for a transform block that is related to DWT, according to an example. DWT captures both frequency and location information by building a multi-resolution decomposition over multiple frequency bands. By learning both the wavelet coefficients for a DWT block 605 as shown in the inference design 600 illustrated in FIG. 6, as well as the best bit-width $A_{(HL,HH,LH,LL)}$, for each component {HL,HH,LH,LL} at the $i^{th}$ level, a more optimal (accuracy vs implementation cost) inference solution is enabled.

Figure 7A:
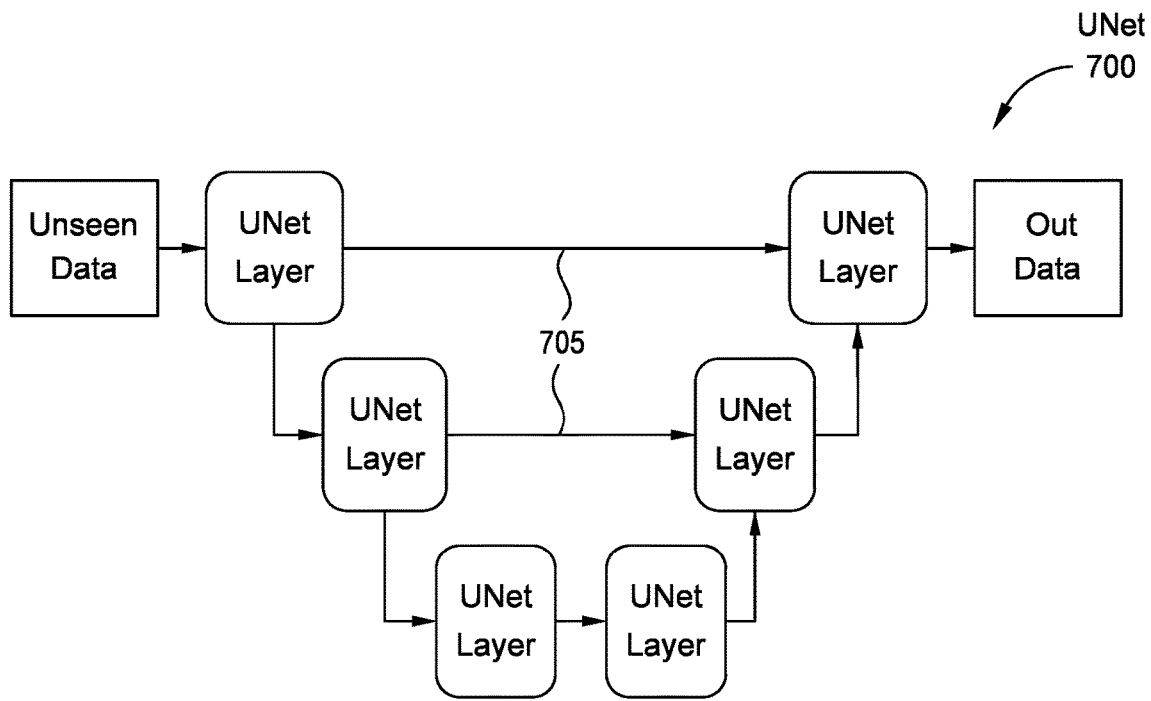
FIGS. 7A-7B illustrate adding a transform block into a UNet, according to an example.
Figure 7B:
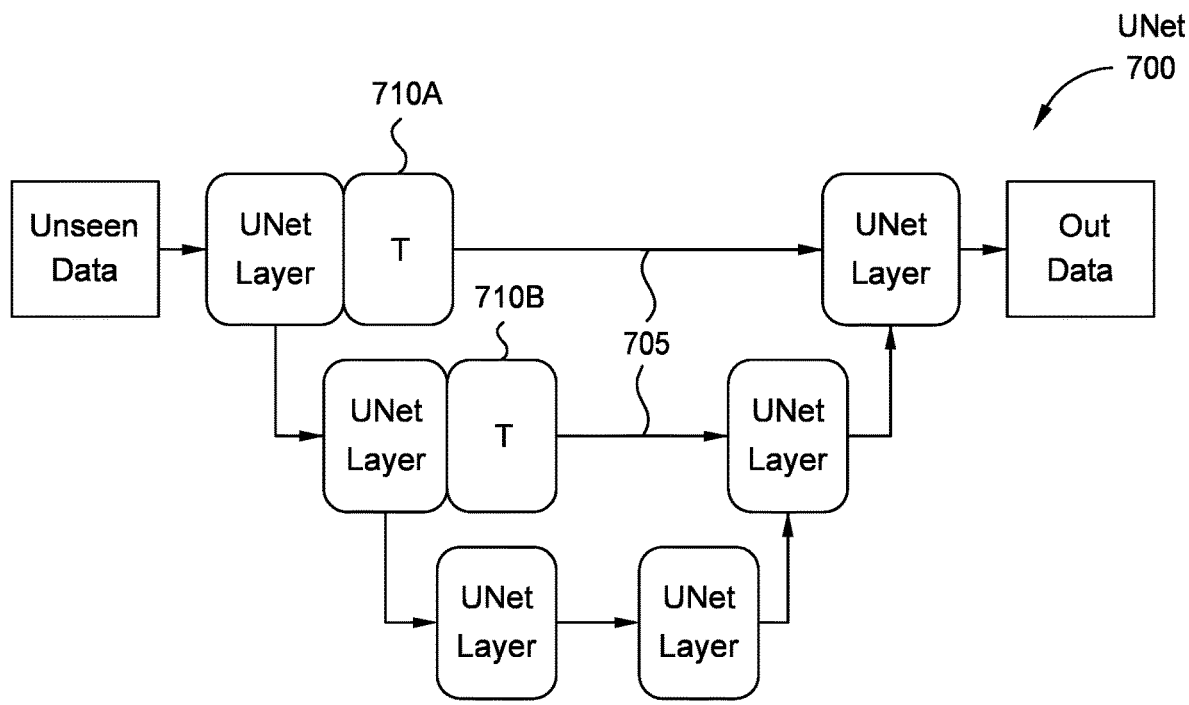

FIGS. 7A-7B illustrate adding a transform block into a UNet 700, according to an example. A UNet is a convolutional neural network that is based on a fully convolutional network to work with fewer training images and to yield more precise segmentations. UNets offer a commonly used network topology for pixel to pixel (image) transformations. To obtain high accuracy, horizontal concatenation connections are used as shown by the arrows 705 in FIG. 7A. These connections typically carry over many channels, resulting in a significant (memory related) implementation cost.

FIG. 7B illustrates adding learnable transform blocks 710A and 710B in the UNet 700, which can be trained using the techniques discussed above. Adding the blocks 710A and 710B may reduce the number of concatenation layers carried over the horizontal connections 705 or can even eliminate the concatenation layers, to enable a more optimal accuracy versus implementation cost solution.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:
receiving training data at a transform block;
transforming the training data using the transform block to generate transformed data, wherein the transformed data requires at least one of less compute resources or less memory to process by a hardware device hosting a neural network;
inputting the transformed data to a layer in the neural network; and
learning parameters for the transform block during a training phase of the neural network, wherein adjusting the parameters for the transform block adjusts an amount of compute resources or memory used by the hardware device when processing the transformed data.

2. The method of claim 1, wherein learning the parameters for the transform block is based on a multi-objective cost function that balances a cost of implementing the neural network on the hardware device with an accuracy of the neural network.

3. The method of claim 2, wherein the multi-objective cost function maximizes the accuracy of the neural network while minimizing the cost of implementing the neural network on the hardware device.

4. The method of claim 1, wherein learning the parameters for the transform block comprises:
identifying discriminative features in the training data that have, according to a threshold, a substantial impact on an accuracy of the neural network.

5. The method of claim 4, wherein adjusting the parameters is performed to keep the discriminative features in the training data.

6. The method of claim 1, further comprising:
providing a second transform block, wherein the second transform block is disposed between two layers in the neural network;
transforming the training data using the second transform block to generate second transformed data; and
learning second parameters for the second transform block during the training phase of the neural network.

7. The method of claim 6, further comprising:
upon determining that an inherent computational cost of at least one of the transform block or the second transform block outweigh its computational savings from transforming the training data, removing the at least one of the transform block of the second transform block before entering an inference phase.

8. A computing system, comprising:
a processor;
memory storing an application which, when executed by the processor, performs an operation, the operation comprising:
receiving training data at a transform block;
transforming the training data using the transform block to generate transformed data, wherein the transformed data requires at least one of less compute resources or less memory to process by a hardware device hosting a neural network;
inputting the transformed data to a layer in the neural network; and
learning parameters for the transform block during a training phase of the neural network, wherein adjusting the parameters for the transform block adjusts an amount of compute resources or memory used by the hardware device when processing the transformed data.

9. The computing system of claim 8, wherein learning the parameters for the transform block is based on a multi-objective cost function that balances a cost of implementing the neural network on the hardware device with an accuracy of the neural network.

10. The computing system of claim 9, wherein the multi-objective cost function maximizes the accuracy of the neural network while minimizing the cost of implementing the neural network on the hardware device.

11. The computing system of claim 8, wherein learning the parameters for the transform block comprises:
identifying discriminative features in the training data that have, according to a threshold, a substantial impact on an accuracy of the neural network.

12. The computing system of claim 11, wherein adjusting the parameters is performed to keep the discriminative features in the training data.

13. The computing system of claim 8, wherein the operation further comprises:
providing a second transform block, wherein the second transform block is disposed between two layers in the neural network;
transforming the training data using the second transform block to generate second transformed data; and
learning second parameters for the second transform block during the training phase of the neural network.

14. The computing system of claim 13, wherein the operation further comprises:
upon determining that an inherent computational cost of at least one of the transform block or the second transform block outweigh its computational savings from transforming the training data, removing the at least one of the transform block of the second transform block before entering an inference phase.

15. A non-transitory computer readable medium having program instructions embodied therewith, the program instructions executable by a processor to perform an operation, the operation comprising:
receiving training data at a transform block;
transforming the training data using the transform block to generate transformed data, wherein the transformed data requires at least one of less compute resources or less memory to process by a hardware device hosting a neural network;
inputting the transformed data to a layer in the neural network; and
learning parameters for the transform block during a training phase of the neural network, wherein adjusting the parameters for the transform block adjusts an amount of compute resources or memory used by the hardware device when processing the transformed data.

16. The non-transitory computer readable medium of claim 15, wherein learning the parameters for the transform block is based on a multi-objective cost function that balances a cost of implementing the neural network on the hardware device with an accuracy of the neural network.

17. The non-transitory computer readable medium of claim 15, wherein learning the parameters for the transform block comprises:
identifying discriminative features in the training data that have, according to a threshold, a substantial impact on an accuracy of the neural network.

18. The non-transitory computer readable medium of claim 17, wherein adjusting the parameters is performed to keep the discriminative features in the training data.

19. The non-transitory computer readable medium of claim 15, wherein the operation further comprises:

providing a second transform block, wherein the second transform block is disposed between two layers in the neural network;

transforming the training data using the second transform block to generate second transformed data; and learning second parameters for the second transform block during the training phase of the neural network.

20. The non-transitory computer readable medium of claim 19, wherein the operation further comprises:

upon determining that an inherent computational cost of at least one of the transform block or the second transform block outweigh its computational savings from transforming the training data, removing the at least one of the transform block of the second transform block before entering an inference phase.

* * * * *